FIG. 5
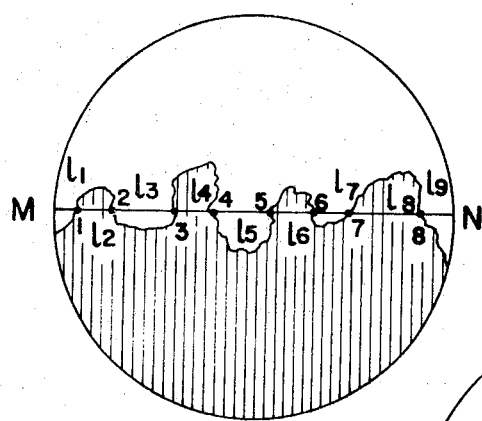
FIG. 6
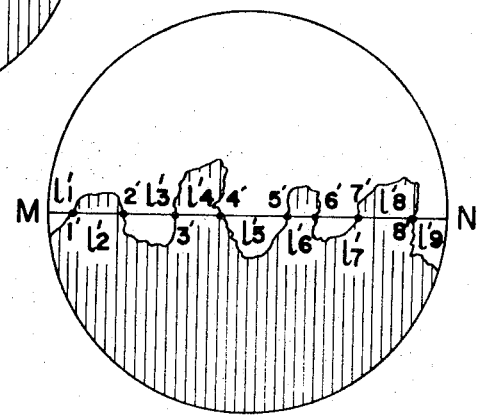
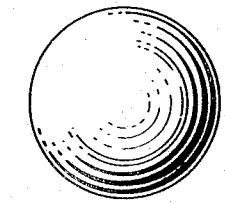
FIG. 8A
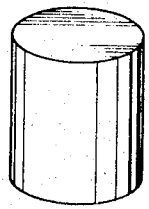
FIG. 8B
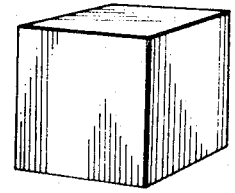
FIG. 8C

FIG. 9A
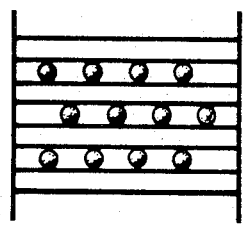
FIG. 9B
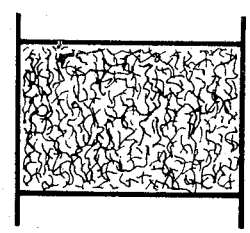
FIG. 10
| WT OF PACKING \ DIA OF STL BALL | 0.5mm ϕ | 1.0mm ϕ | 1.5mm ϕ | 2.0mm ϕ |
|---|---|---|---|---|
| 0.5 g | | | | |
| 1.0 g | | | | |
| 1.5 g | | | | |

United States Patent Office 3,781,399
Patented Dec. 25, 1973

3,781,399
METHOD FOR PRODUCING A
COMPOSITE FIBER
Hidehiko Kobayashi, Kiichiro Sasaguri, and Masaaki Shiga, Tokyo, Japan, assignors to Asahi Kasei Kogyo Kabushiki Kaisha, Osaka, Japan
Filed Sept. 16, 1969, Ser. No. 858,295
Claims priority, application Japan, Oct. 2, 1968, 43/71,742; Nov. 1, 1968, 43/79,271, 43/79,272
Int. Cl. B29f 3/10
U.S. Cl. 264—171   2 Claims

ABSTRACT OF THE DISCLOSURE

A method for producing a composite polymeric fiber which involves introducing a first polymer having fiber forming properties into a first inlet zone, introducing a second polymer having fiber forming properties into a second inlet zone, said first and second polymers having inherently poor adherent properties relative to each other, causing all of said first and second polymers exiting from said first and second inlet zones to flow into a mixing zone that does not communicate with any other inlet zones, said mixing zone being at least partially filled with a packing material having a diameter of about 0.2 mm. to 2 mm. and which forms a bed at least 5 mm. thick and causing all of the polymers flowing through said packed mixing zone to thereafter be extruded through a *single* spinning hole as a *single* composite fiber, the single composite fiber exiting from said single spinning hole having a jagged boundary interface for the component polymers, said jagged boundary interface being minutely and irregularly complicated when viewed from both the transverse and longitudinal axes of the filament.

DESCRIPTION

This invention relates to composite fibers having very strong adhesion between two or more of component polymers which have inherently poor adherent properties between each other and are extruded from a common spinneret and in which the boundary line of each component polymer has fine irregularity not only in the section perpendicular to the axis of fibers but also in the section along the axis of fibers, to a method for producing the same and also to an assembly of spinneret for producing the same.

It has been put into practice and prevalent to connect different kinds of polymers having different shrinkage as components of fibers to produce excellent crimp.

Various products made of composite fibers are already found in markets. However, the most important problem which is necessary to be solved is how to improve the adherent property between each component polymer. Generally speaking, the combination of polymers having physical and chemical properties different as much as possible, is suitable to produce novel composite effects but it brings about tendency of reduction of mutual adhesiveness. The composite effects herein referred to are meant by such effects as crimping characteristic realized in the combination of those having different shrinkage, moisture absorbing property realized in the combination of a hydrophobic polymer and a hydrophilic polymer and dyeability realized in the combination of polymers having excellent dyeability and poor dyeability. The compatibility of different polymers is not generally good and even when composite fibers are made, each component is liable to separate from each other and as a result, the effect obtained by conjugation is almost lost, e.g. stretchability, bulkiness or appearance is extremely reduced.

Accordingly, it has been necessary to combine polymers having mutual adhesiveness, to enhance to the adhesiveness by copolymerization, mixing or the like or to use a special spinneret in order to produce a special gradient of concentration of a component in the neighborhood of the boundary of different components.

Various kinds of spinnerets for composite fibers have heretofore been proposed in order to firmly joint two or more of polymers inherently poor in adhesiveness into composite fibers having excellent bond. For example, various sheath-core type spinnerets, side by side type spinnerets which give an adhesive surface of special complicated pattern, a spinneret assembly designed to adhere mixture of different ratio of each component as if sandwiched in order to reduce shearing stress at boundary surface have been known among the spinneret assembly designed to give adhesive property to two or more than two polymers. However, most of them are designed so as to prevent the detachment of two components by making the boundary surface of different components regularly complicated in transverse section and the joint of component's polymers thereby obtained was insufficient. There have been no attempt found to improve the joint of component polymers by making the boundary surface of different components complicated not only in transverse section but also in longitudinal i.e. axial section.

An object of the present invention is to provide composite fibers having far improved adhesiveness than conventional ones, the boundary surface of different components in the conventional ones being regularly complicated only in transverse section of fibers.

Another object of the present invention is to provide composite fibers wherein the boundary surface of different components are made so complicated that it satisfies specified conditions.

A further object of the present invention is to provide a method for producing composite fibers having much more improved adhesiveness than conventional ones.

A still further object of the present invention is to provide a spinneret assembly for producing composite fibers having much more improved adhesiveness than conventional ones.

These objects can be attained by the present invention.

The present invention consists in composite fibers whose boundary line of the component polymers are not only complicated minutely and irregularly in the cross-section of filaments perpendicular to fiber axis but also in the section of filaments along the fiber axis. The present invention consists, as its embodiment, in composite fibers having boundary lines of the components polymers in their transversal section so complicated minutely and irregularly that when the cross-section is cut with a straight line which gives a maximum number of cross-points with the boundary line, the number of cross-points is more than 5, the length of the longest one among the segments formed by two adjacent cross-points is shorter than ½ of the length of said straight line cut by two kinds of polymers and two boundary lines at any two cross-sections 1 cm. apart from each other in one filament have different number of cross-points when cut by the respective straight lines which give maximum number of cross-points or even when such two boundary lines have the same numbers of cross-points, the lengths of corresponding segments between two adjacent cross-points are different more than 3% in average.

The present invention consists also in a method for producing composite fibers having superior adhesiveness which comprises introducing from different inlets two or more than two kinds of polymers having fiber-forming property in mobile state into a mixing zone provided in a spinneret and packed with the packing material having about 0.2 mm. to 2 mm. diameter in a layer of more than about 5 mm. thick and immediately subjecting the mixed polymers to extrusion into filaments.

The present invention further consists in an assembly of spinneret for spinning composite fibers having at least one set of the arrangement comprising inlets for introducing two or more than two kinds of polymers having fiber-forming property in mobile state, a junction part of mobile state polymers, a mixing chamber packed with the packing material having about 0.2 mm. to 2 mm. diameter and spinning holes, the mobile state polymer passing in this order.

The spinneret assembly of the present invention may have in more generalized form at least one set of the arrangement comprising inlets for introducing two or more than two kinds of thermoplastic polymers in mobile state, a junction part of mobile state polymers, a mixing chamber packed uniformly with packing material which satisfies the condition defined by a formula $$1 \text{ cm.}^{-1} < \frac{L(1-\epsilon)}{\overline{D}_p{}^2} < 10^4 \text{ cm.}^{-1}$$

and spinning holes, the mobile state polymer being passed through the parts in the above-mentioned order to produce composite fibers having boundary surfaces between each polymer so complicated minutely and irregularly that mixing degree becomes $x > 0.1$ wherein L is length of packed ltyer, $\epsilon$ is proportion of gap, $\overline{D}_p$ is a mean diameter of packing material and X is defined by formula $$X = \frac{n}{S_o} \sum_{i=1}^{n} S_i$$

wherein $S_1, S_2 \ldots S_i \ldots S_n$ are areas of $n$ regions surrounded respectively by segments $l_1, l_2 \ldots l_i \ldots$ and $l_n$ formed on the straight line which crosses the boundary surface between two components mostly by being cut with the boundary line between two components, and the boundary line of two components, and $S_o$ is the total area of the fiber cross section with a proviso that $l_i$ of $$l_i/l_o < \frac{1}{100}$$

and $S_i$ of $$\frac{S_i}{S_o} < \frac{1}{1000}$$

are neglected.

It is a feature of the composite fibers of the present invention that the adhesive surface is complicated minutely and irregularly not only in the cross-section of fibers but also in the surface along the fiber axis. The composite fibers having such an adhesive surface are provided with surprisingly strong adhesiveness concurrently with superior handle, hence their commercial value is very great. Such composite fibers are considered to be an intermediate one between the composite fibers of so called side-by-side type wherein the boundary surface of two components forms perfect plane surface and the mixture fibers wherein two components are prefectly mixed.

When a shearing force working upon the adhesive surface of each component exceeds a certain value, the adhesive surface separates. Since the factor which contributes to the separation of two kinds of components of composite fibers having different heat shrinkages and elasticities is mostly the shearing stress working upon the boundary surface, it is evident that the adhesiveness is increased by making boundary surface complicated not only in the cross-section of fibers but also three-dimensionally in the longitudinal section along the fiber axis. Further the boundary surface of different components complicated so minutely and irregularly in the composite fibers of the present invention increases remarkable adhesiveness. As illustrated in FIG. 2, different components intrude mutually into the region of the other component in very complicated and varied manner. The composite fibers having adhesive surfaces of such structure are furnished with extremely firm adhesiveness even when each component has inherently no adhesiveness.

In spite of the extreme complexity of boundary surface of two components, the composite fibers having superior adhesiveness can be well defined when the compatibility of two components is bad.

A detailed description of the invention follows, taken in conjunction with the accompanying drawings, wherein:

FIG. 5 to FIG. 7 are transverse sections at two different points of the same filament;

FIGS. 8A, 8B and 8C are perspective views of representative packing materials which are inserted in a mixing chamber D of FIG. 1;

FIGS. 9A and 9B are longitudinal cross section of a part of the mixing chamber D of FIG. 1 packed with different packing materials;

FIG. 10 is a diagram showing the difference of fiber cross-section relative to sizes and amount of ball packed in the mixing chamber of FIG. 1;

Figure 1:
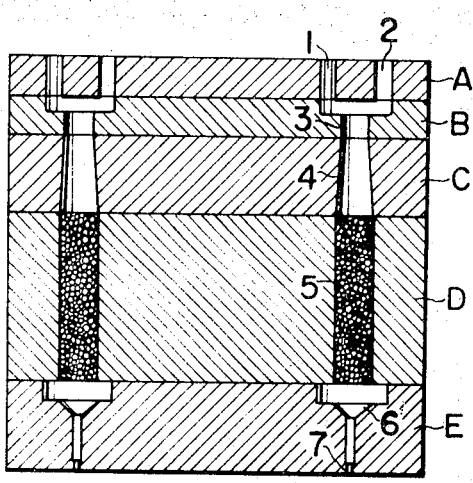
FIG. 1 is a longitudinal section of the nozzle assembly for producing composite fibers of the present invention.

Referring now to FIG. 1, the spinneret assembly of the present invention consists of 6 parts; an inlet-plate A, a junction plate B, a section-enlarging plate C, a mixing plate D and a spinning hole plate E.

Different polymers melted at foregoing step are introduced in separate inlets 1 and 2 and join at a T-shaped passageway 3. The conical passageway C is necessary when the diameter of the outlet of 3 is smaller than the diameter of packed hole 5. This is necessary in order not to disturb the boundary surface of different components too much before entering 5. During the travel of the melt through the packed hole 5, different components enter the region of the other component in complicated manner and the boundary surface is put in disorder delicately and irregularly and after passing through a conical passageway 6, they are extruded in the outside through a spinning hole 7.

Figure 2:
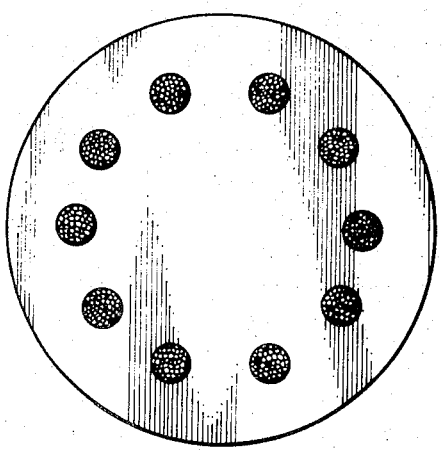
FIG. 2 is a transverse section of member D of FIG. 1.

Referring to FIG. 2, 10 packed holes are arranged in equiangular disposition. The number of set consisting of inlets, junction part, packed hole and spinning hole is determined depending upon relation of diameter of spinning hole and packed hole, easiness of fabrication, mechanical strength, spinning condition, etc.; hence there is no particular limitation to the number of set.

Figure 3:
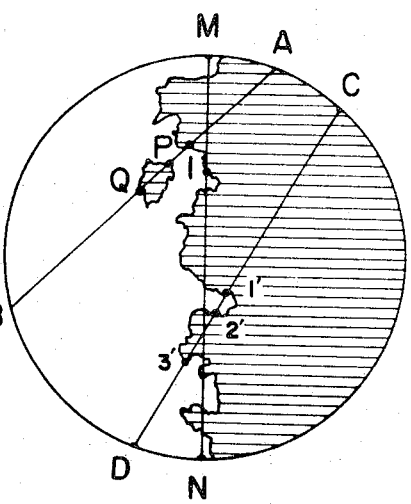
FIG. 3 is a representative transverse section of a two component composite fiber.

Referring now to FIG. 3, there is shown a cross-section of the composite fibers of the present invention which are spun in conjugate manner with the same adhering ratio. In the drawing, straight lines AB, CD and MN are arbitrary straight lines crossing the transverse section of a filament of fibers. A straight line AB crosses a boundary surface of two components at a point 1 and a straight line CD crosses at points 1', 2' and 3'. Among many straight lines thus drawn, the straight line having the greatest number of cross-points with the boundary surface, is MN. If lengths between two adjacent points and the length of the straight line MN are, respectively $l_1, l_2, l_3 \ldots l_n$ and $l_o$, it has now been found that excellent adhesiveness can be attained if following conditions are satisfied: Namely if $l_i$ is the longest segments among $n$ segments of $l_1, l_2, l_3 \ldots l_n$ which satisfy a relation of $0.01 < l_i/l_o < 1$, relations of $$l_i < \frac{l_o}{2}$$

$n > 5$ are maintained.

In this case, such points as P, Q, etc. which are cross-points of AB with a boundary line in case one component is isolated in the other component are not taken into count, assuming that they do not contribute to the bond. Further the above-mentioned condition must be established in any given cross-section of filament. However, this condition is un-necessary when adhesiveness of two kinds of polymer is good.

It may be possible to soften the condition according to the grade of adhesiveness.

Figure 4:
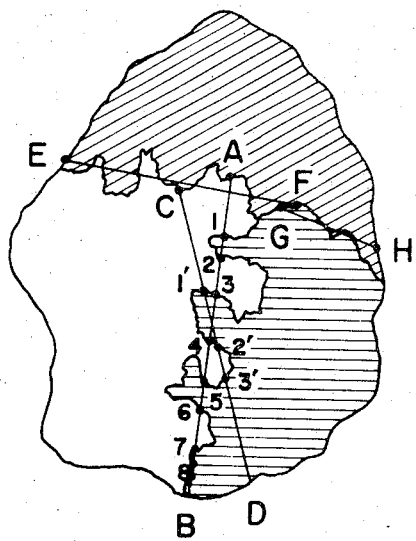
FIG. 4 is a representative transverse section of a three component composite fiber.

FIG. 4 is an example of transverse cross-section of composite fibers produced by the conjugate spinning of three kinds of polymers in a specified ratio. In this case also, the above-mentioned method and conditions are quite similarily applied to any two kinds of component among three kinds. The same can be applied to cases of four or more than four components.

As described, one characteristic feature of the composite fibers of the present invention is a great complication not only in transverse cross section of fibers but also along a fiber axis. The complication in the direction of a fiber axis is meant by the fact that numbers of cross-points formed by cutting boundary line of two components with the straight line which gives maximum number of cross-points are different at two different cross sections which are 1 cm. apart or even when the said maximum number are same, lengths between corresponding two adjacent cross points are different by more than 3% in average. For example, FIGS. 5 and 6 show any two cross-sections 1 cm. apart from each other and the number of crossings of a straight line with boundary surface is 8. If lengths of segments cut by two adjacent cross-points are $l_1, l_2 \ldots l_9$ and $l'_1, l'_2 \ldots l'_9$, respectively, and a condition of $$\frac{1}{9} \sum_{i=1}^{9} \frac{|l_i - l'_i|}{\text{shorter one among } l_i \text{ and } l'_i} \times 100 > 3$$

is satisfied, the boundary of filament is deemed to have changed.

The above-mentioned condition which defines the disorder of boundary of two components at cross-sections of a filament and also defines the substantial difference of boundary surfaces between two cross-sections is not only applied to cases of combination of polymers lacking in adhesiveness but also to all combinations capable of subjecting to conjugate spinning including combinations of components having superior adhesiveness.

Thus the fact that number of cross-points formed by cutting a fiber section with the straight line which gives maximum number of cross-points among the ones which cross the boundary line of two kinds of polymer component, is more than 5, the fact that the length of the longest segment among all the segments between two adjacent cross-points is shorter than ½ of the length of the above-mentioned straight line, and the fact that maximum numbers of cross-points between boundary surfaces of two kinds of polymer components and a straight line which gives maximum cross-points are different at any two cross-sections of the same filament apart by 1 cm. from each other or when they are same, lengths between corresponding two adjacent cross points are different by more than 3% in average, are important conditions for delicate and irregular disorder of boundary surface. So long as these conditions are satisfied, there were observed no detachment at all not only in case of low stretching such as 2 to 3 times but also in a severe detachment test comprising high stretching such as 5 to 12 times, immersion of stretched specimen in hot water for a long period of time and then rubbing of immersed specimen, regardless to say of a case where only simple rubbing with hands is applied.

There were often observed detachment when either of the above-mentioned conditions is not satisfied.

Figure 7:
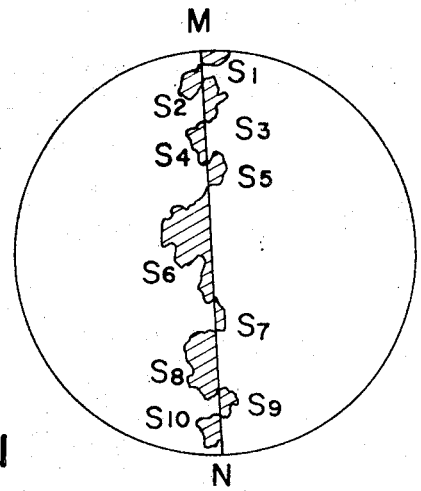

FIG. 7 is a cross-section of one example of composite fibers spun by using a spinneret assembly of the present invention with a bond ratio of 2 kinds of polymers of 1:1. A straight line MN is drawn to cross the boundary of two components by greatest number of times. Let lengths of $n$ segments formed by cutting this straight line with a boundary line of two components be $l_1, l_2 \ldots l_n$ and let areas of $n$ regions surrounded by these segments and the boundary line of two components be $S_1, S_2 \ldots S_n$, then mixing grade of two components is defined by $$X = \frac{N}{S_o} \sum_{i=1}^{n} S_i$$

wherein $S_o$ is total area of fiber cross-section with the proviso that if the length of the straight line MN is $l_o$, such $l_i$ as defined by $l_i/l_o < 1/100$ and such $S_i$ as defined by $$S_i/S_o < \frac{1}{1000}$$

are neglected.

It has now been found by experiments that mixing ratio can be represented by $$X = \frac{SL(1-E)Q}{k\mu \overline{D}_p^2}$$

wherein $k$ is proportional constant (cm.$^2$), S is cross-sectional area of a spinning hole (cm.$^2$), L is length of packed layer (cm.), E is gap ratio of packed layer, Q is flow amount of melted polymer (g./sec.), M is mean viscosity of melts of two components (poise), $\overline{D}_p$ is mean diameter of particle length (cm.)

$$\overline{D}_p = \frac{\sum n D_p^2}{\sum n D_p}$$

wherein $D_p$ is a diameter of one particle $(6V/\pi)^{1/3}$ and V is a volume of one particle.

In practical cases, the mixing grade X does not appear directly on adhering strength. Adhering strength undergoes a great stride of variation depending upon of polymers to be combined, thickness of filament, adhering ratio, configuration of fiber cross-section, stretching condition, heat treatment condition, etc. When these conditions are maintained at constant values, adhering strength increases with increase of X. This is particularly remarkable when there is complication of boundary of $X > 0.1$. Namely not only in case of low stretching such as 2 to 3 times but also in case of such severe detachment test as rubbing of specimen after immersion in hot water for long time regardless to say about cases of such detachment tests as simple rubbing of specimen, etc. there were observed absolutely no detachment. However in case of $X > 0.1$, detachment was observed in severe detachment test.

Since common spinning condition of thermoplastic polymer falls within ranges of $10^{-4}$ cm.$^2 < S < 10^{-2}$ cm.$^2$
$10^{-3}$ g./sec. $< Q < 10^{-1}$ g./sec.
500 poises $< \mu <$ 5000 poises it is easy to produce composite fibers of two or more than two kinds of thermoplastic polymers having mixing ratio of $X > 0.1$. As for such packing materials as indicated in FIG. 9, the above-mentioned checking is difficult but it is easy to disturb a boundary surface so as to give $X > 0.1$.

As packing material, chemically inactive materials having sufficient mechanical strength under common spinning condition are selected. Metals, glass, sand, table salt, etc. are used. As shown in FIG. 8, shape of packing material is preferable to be spherical, cylindrical and cubic. As packing material, those having uniform particle diameter or those having different particle diameter piled in layer, can be used. Further, it is also possible to use a packing material having some particle size distribution or a mixture of two or more than two kinds of packing material having different configuration and size.

Further it is also possible to insert a specified structure which can control characteristics of melt mixture of two kinds of polymers as indicated in FIG. 9. In this drawing (A) is a material obtained by piling wires lengthwise and breadthwise successively to form a checkered work and fixing the resulting structure, and (B) is a material obtained by rolling up glass wool and fixing both the end of it with a metal net.

Complication degree of boundary surface of resultant composite fibers varies depending upon the kind and quantity of packing material and the kind of polymer to be combined, and effective bond strength can be attained by a packed hole and packing materials which satisfy specified condition.

Polymer components capable of spinning into composite fibers of the present invention include polyamides such as 6-nylon, 6,6-nylon, etc., polyester such as polyethylene terephthalate, etc., polyolefin such as polyethylene, polypropylene, etc., polyvinyl compound such as polyvinyl chloride, polyvinylidene chloride, polyvinyl alcohol etc., polyurea, polyurethane, polyacetal, polycarbonate, polyether, polyoxymethylene, polyformal, polythiourea, polyimide, polythioether and copolymer of these polymers. The present invention can be applied to any combination of melt-spinnable polymers, a combination of polyacrylonitrile and its copolymer or a mixture thereof, a combination of polyvinyl alcohol and its modified polymer and all other combination of polymers which can be spun into composite fiber not only in case of two components but also in case of three or more components.

Following examples are offered to illustrate the composite fibers of the present invention, and a method and an apparatus for producing the same but they are by no means offered to limit the scope of the present invention.

EXAMPLE 1

Various sizes of steel balls in various amounts were filled in a packing layer 5 of a spinneret assembly shown in FIG. 1 to produce 12 kinds of side-by-side type of composite fibers as shown in FIGS. 3, 4, 5, 6 and 11.

The diameter and length of packing layer were 5 mm. and 20 mm., respectively and the diameter, weight and number of steel ball were as shown in Table 1.

TABLE 1

| | Diameter of steel ball | | | |
|---|---|---|---|---|
| | 0.5 mm. φ | 1.0 mm. φ | 1.5 mm. φ | 2.0 mm. φ |
| Weight of packing material, g.: | | | | |
| 0.5 | 330 balls | 120 balls | 40 balls | 15 balls |
| 1.0 | 660 balls | 230 balls | 70 balls | 30 balls |
| 1.5 | 1,000 balls | 350 balls | 120 balls | 50 balls |

The combinations of polymers used were of 3 kind; i.e. (nylon-6+polyethylene terephthalate), (nylon-66+polyethylene-1,2-diphenoxyethane-4,4'-dicarboxylate) and (polyethylene+polypropylene). Since the complication of adhering surface and adhering strength were almost same, description will be given only in the case of the combination of nylon-6 and polyethylene terephthalate.

Polyethylene terephthalate having a reduced viscosity of 0.733 when dissolved in 2:1 by weight mixture of tetrachloroethane and phenol to give a concentration of 0.5 g./cc. at 35° C. and nylon-6 having a reduced viscosity of 1.26 when dissolved in m-cresol to give a concentration of 0.5 g./cc. at 35° C. were extruded from the above-mentioned spinneret at a spinning temperature of 280° C. and taking up velocity of 500 m./min. to give unstretched filaments of 123 denier/10 filaments. These unstretched filaments were stretched 3.5 times the original length by running on while touching a surface of a hot plate maintained at 140° C. whereby fine crimps were immediately developed.

For 12 kinds of different packing method, samples, spinning condition and stretching condition were all the same.

When the samples were dyed with an acid dye, patent blue Azure Blue V, by using a common dyeing method, only nylon-6 was dyed. After washing with water and drying in air, the cross-sections were observed. The results are as shown in FIG. 5 and FIG. 10. It was observed that the boundary surface of two components varied in every section.

Those indicated in figure are only one example but it was found, from a number of runs, that (i) the smaller the diameter of packing material is, the more minutely and delicately the boundary surface is complicated. (ii) The greater the amount of packing material is, the greater the complication is.

As one method for indicating the degree of complication of boundary surface, the length of boundary line is measured and ratio of it relative to the diameter of filament is determined. The result obtained is shown in Table 2.

TABLE 2

| | Diameter of ball | | | |
|---|---|---|---|---|
| | 0.5 mm. φ | 1.0 mm. φ | 1.5 mm. φ | 2.0 mm. φ |
| Weight of packing material, g.: | | | | |
| 0.5 | 1.8 | 2.1 | 1.8 | 1.1 |
| 1.0 | 1.9 | 2.5 | 2.5 | 1.2 |
| 1.5 | 2.3 | 2.6 | 2.9 | 1.4 |

The smaller the particle diameter is the boundary line of two components should be longer but since the boundary line was so finely complicated that the actual lengths were not calculated precisely. Namely the actual boundary lines seems to be longer than those indicated in the table. They were measured by photographies of actual cross-sections (A) and (B) which are apart by 1 cm. on the axis of fibers in case 1.0 g. of balls of 1.0 mm. φ were packed. The degree of complication was about 2.5 in (A) and about 1.6 in (B). Since considerable difference appears at two cross-sections 1 cm. apart in the same one filament, it is difficult to give precise value but according to the photographic measurement which magnifies the diameter of filaments to 5 cm., it was found that when the length of boundary line becomes less than 1.3 times, the adhesiveness is almost lost. The cross-sections (A) and (B) clearly show that the boundary line of two components varies greatly along the direction of axis of fibers.

Further from the photographies showing cross-sections of 12 kinds of composite fibers, maximum $l_1$, and the maxima number of cross-point of a line with a boundary line were calculated with regard to $l_1$ which satisfies the relation of $$0.01 < \frac{l_1}{l_0} < 1$$

according to the method hereinbefore described, and the result shown in Table 3 was obtained.

TABLE 3

| | Diameter | | | | | | | |
|---|---|---|---|---|---|---|---|---|
| | 0.5 mm. φ | | 1.0 mm. φ | | 1.5 mm. φ | | 2.0 mm. φ | |
| | $l_1/l_0$ | n | $l_1/l_0$ | n | $l_1/l_0$ | n | $l_1/l_0$ | n |
| Weight, g.: | | | | | | | | |
| 0.5 | 0.30 | 9 | 0.45 | 4 | 0.61 | 3 | 0.64 | 2 |
| 1.0 | 0.25 | 13 | 0.37 | 6 | 0.52 | 4 | 0.59 | 3 |
| 1.5 | 0.11 | 15 | 0.24 | 8 | 0.40 | 4 | 0.38 | 3 |

Figure 11:
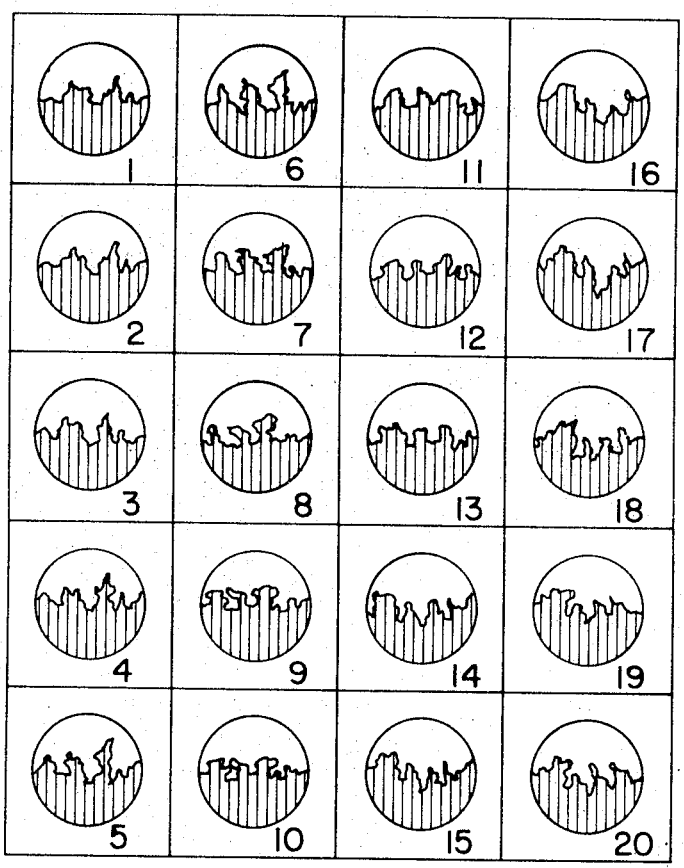
FIG. 11 is successive transversal cross sections of the same filament cut by planes vertical to fiber axis and apart from each other by a given distance.

FIG. 11 shows 20 successive cross-sections obtained by cutting, in every 1 mm., the filaments spun by using a layer packed with 23 pieces of 1.0 mm. φ steel ball and stretched by 3.5 times. It is well observed that the cross-section varies a great deal in every cross-section.

Table 4 shows number of maximum cross-points measured from 20 drawings of cross-section of FIG. 11 and Table 5 shows the result of mean distances between corresponding two cross-points among 1 and 11; 2 and 12; 3 and 13; . . . 10 and 20, calculated in accordance with the method hereinbefore described. Mark X shows that the number of cross-points are not same.

TABLE 4

| | |
|---|---|
| 1 | 6 |
| 2 | 6 |
| 3 | 6 |
| 4 | 6 |
| 5 | 7 |
| 6 | 6 |
| 7 | 6 |
| 8 | 6 |
| 9 | 5 |
| 10 | 6 |
| 11 | 6 |
| 12 | 7 |
| 13 | 8 |
| 14 | 7 |
| 15 | 6 |
| 16 | 6 |
| 17 | 5 |
| 18 | 5 |
| 19 | 6 |
| 20 | 6 |

TABLE 5

| | Percent |
|---|---|
| 1–11 | 3.5 |
| 2–12 | X |
| 3–13 | X |
| 4–14 | X |
| 5–15 | X |
| 6–16 | 4.6 |
| 7–17 | X |
| 8–18 | X |
| 9–19 | X |
| 10–20 | 3.3 |

In these experiments, 10 spinning holes were used and the cross-sectional area of one hole was $$S = 3.14 \times (0.05/2)^2 = 1.96 \times 10^{-3}$$

cm.$^2$ and extruded amount was $Q = 1.11 \times 10^{-2}$ g./sec. The viscosities of melt was 1420 poises for polyethylene terephthalate and 1380 poises for polycaproamide; hence mean viscosity was 1400 poises.

Four kinds of steel balls having diameters of $D_p = 0.05$, 0.10, 0.15, and 0.20 cm. were packed to give lengths of packed layer of $L = 0.5$, 0.8 and 1.1 cm., respectively. Thus spinning was carried out by using 12 different packing methods. The gap ratio in this case was $e = 0.32$.

Accordingly, the values of $$\frac{L(1-e)}{\overline{D}_p{}^2}$$

are given in following tables.

TABLE 6

| $\overline{D}_p$ | 0.05 | 0.10 | 0.15 | 0.20 |
|---|---|---|---|---|
| L=0.5 | 136 | 34 | 15.1 | 8.5 |
| L=0.8 | 217 | 54 | 24.2 | 13.6 |
| L=1.0 | 299 | 75 | 33.2 | 18.7 |

The corresponding values of X of unstretched filaments were measured in accordance with the method described hereinbefore. In this case $S_i$ was determined by copying the cross-section of filament on a sheet of paper having uniform thickness and weighing the weight of cut part of the paper corresponding to $S_i$. The result is shown in Table 7.

TABLE 7

| $\overline{D}_p$ | 0.05 | 0.10 | 0.15 | 0.20 |
|---|---|---|---|---|
| L=0.5 | 1.8 | 0.12 | 0.14 | 0.01 |
| L=0.8 | 2.3 | 0.52 | 0.06 | 0.02 |
| L=1.1 | 3.5 | 1.1 | 0.09 | 0.04 |

These unstretched filaments were stretched by 3, 4 and 5 times the original length by running on and contacting with a hot plate maintained at 140° C. The denier of unstretched filaments was about 12 denier per one filament. After immersed in hot water at 120° C. for 2 hours, the stretched filaments were dried in air and observed by a microscope. Those whose X is greater than 0.1 did not show detachment at all in all stretching ratios but those whose X is smaller than 0.1, detachment was observed in case of large stretch ratio (5–6 times).

EXAMPLE 2

Even when 12 kinds of samples in Example 1 were crumpled, two components do not separate but when they were immersed in a hot water for a long time, some of them revealed breakage. In this respect, observation of adhering strength was made by immersing in hot water at 120° C. for 2 hours. Namely after treatment with hot water, the samples were dried in air, rubbed with hands and the grade of detachment was observed. The result is shown in Table 8.

TABLE 8

| | Diameter of ball | | | |
|---|---|---|---|---|
| | 0.5 mm. $\phi$ | 1.0 mm. $\phi$ | 1.5 mm. $\phi$ | 2.0 mm. $\phi$ |
| Weight of packing material, g.: | | | | |
| 0.5 | 5 | 4 | 2 | 1 |
| 1.0 | 5 | 4 | 2 | 1 |
| 1.5 | 5 | 5 | 3 | 1 |

When the sample was treated by dry heat at 150° C. for 15 minutes, detachment is remarkably reduced and there was observed almost no detachment even in case the samples are of a kind most easily broken (the case of 15 balls having a diameter of 2.0 mm.).

The values in Table 8 show grade of detachment and 1 means complete detachment, 2 means that detachment occurs in considerable parts, 3 means that detached parts are somewhat conspicuous, 4 means that only a slight detachment is observed and 5 means that no detachment is observed at all.

EXAMPLE 3

Stretched filament yarns obtained in Example 1 were subjected to dry heat treatment in a hot wind drier maintained at 150° C. under a load of 3 mg./d. for 15 minutes to develop crimp and the characteristic properties of crimp was measured. However, there was observed no significant difference among 12 kinds of samples. The fundamental physical properties and characteristic properties of crimp in case of the balls of 0.5 mm. $\phi$ packed in an amount of 1.5 g. are listed in following Table 9.

TABLE 9

| | |
|---|---|
| Denier | 33.8 d./10 f. |
| Number of crimps | 58 crimps/25 mm. |
| Crimping degree | 19.5%. |
| Crimp elasticity | 84.6%. |
| Strength | 4.7 g./d. |
| Elongation | 14.8%. |
| Young's modulus | 32.6 g./d. |

In this table, number of crimp is numbers of spiral per one inch under 2 mg./d. load, crimping degree is expressed by $$\frac{l-l_o}{l} \times 100$$

wherein $l_o$ is a length under a load of 2 mg./d. and $l$ is a length under a load of 50 mg./d., and crimp elasticity is expressed by $$\frac{l-l_o}{l-\bar{l}_o} \times 100$$

where $\bar{l}_o$ is a length of 2 mg./d. 2 minutes after removing the load of 50 mg./d.

EXAMPLE 4

A component (A) obtained by polymerizing 91.42% by weight of acrylonitrile, 8.3% by weight of methyl acrylamide, 30% by weight of methallyl sulfonic acid, and the other component (B) obtained by polymerizing 89.70% by weight of acrylonitrile, 7.0% by weight of acrylamide, 30% by weight of methallyl sulfonic acid, both by using 2,2' - azobisobutyronitrile as a polymerization initiator were, respectively dissolved in 69% (by weight) purified nitric acid at —5° C. to give a concentration of 15%, and extruded into a 32% nitric acid solution at —5° C. with an adhering ratio of two components of 1:1 by using a spinneret assembly of FIG. 1 having a layer packed with 1000 glass balls of 0.5 mm $\phi$. After washed with water, resultant composite filaments were stretched 8 times the original length in a hot water at 100° C.

When the packing material is not used, resultant composite filaments showed detachment over a considerable parts of the filaments but when about 1000 balls of 0.5 mm. $\phi$ were used, no detachment was observed even when the resultant composite filaments are rubbed severely for a long time.

EXAMPLE 5

Polyethylene - 1,2 - diphenoxyethane - 4,4' - dicarboxylate having a reduced viscosity of 0.763 as measured at 35° C. in a solution containing 0.5 g. of polymer dissolved in 100 cc. of a 2:1 (by weight) mixture of tetrachloroethane and phenol, and nylon 66 having a reduced viscosity of 1.38 as measured at 35° C. in a solution containing 0.5 g. of polymer dissolved in 100 cc. of m-cresol, were passed through a packing zone D of FIG. 1 packed with a checker-work shown in FIG. 9A to spun into composite filaments at 290° C. which were then taken up at a take-up velocity of 500 m./min.

The checker-work was constructed by piling structures having 8 mm. diameter and 5 mm. thickness and made of 0.5 mm. $\phi$ steel wire, mutually lengthwise and breadthwise at an interval of 0.5 mm. in 10 steps. Resultant composite filament yarns were passed on a hot plate kept at 140° C. while touching therewith and stretched by 4 times. After immersion in a hot water at 120° C. for 2 hours, followed by air drying the composite filament yarns were rubbed severely with hands but detachment into two components was not observed at all.

FIG. 9B shows a packing material made by rolling up glass-wool and fixing it at both the ends. This material can be also used as a packing material.

Arbitrary cross-sections of 10 filaments were photographed and according to the same method with that of FIG. 1, the number of maximum cross-points and ratio $l_1/l_o$ wherein $l_1$ and $l_o$ have same meaning as hereinbefore defined, between two points were measured. The result is shown in Table 10.

TABLE 10

| | 1 | 2 | 3 | 4 | 5 | 6 | 7 | 8 | 9 | 10 |
|---|---|---|---|---|---|---|---|---|---|---|
| $n$ | 9 | 9 | 9 | 10 | 10 | 10 | 10 | 9 | 9 | 9 |
| $l_1/l_o$ | 0.15 | 0.16 | 0.16 | 0.18 | 0.18 | 0.19 | 0.17 | 0.13 | 0.14 | 0.15 |

What is claimed is:
1. A method for producing a composite polymeric fiber which is characterized by:
   (a) introducing a first polymer having fiber forming properties in a fluid state into a first inlet zone,
   (b) introducing a second polymer having fiber forming properties in a fluid state into a second inlet zone,
   (c) said first and second polymers having inherently poor adherent properties relative to each other,
   (d) causing *all* of said first and second polymers exciting from said first and second inlet zones to flow into a mixing zone that does not communicate with any other inlet zones,
   (e) said mixing zone being at least partially filled with a packing material having a diameter of about 0.2 mm. to 2 mm. and which forms a bed of at least 5 mm. thick, and
   (f) causing *all* of the polymers flowing through said packed mixing zone to thereafter be extruded through a *single* spinning hole as a *single* composite fiber,
   (g) the single composite fiber exciting from said single spinning hole having a jagged boundary interface for the component polymers, said jagged boundary interface being minutely and irregularly complicated when viewed from both the transverse and longitudinal axes of the filament.

2. A method for producing a plurality of composite fibers which includes;
   (a) a plurality of separate sets of inlet zones, a plurality of separate mixing zones and a plurality of separate spinning holes, each set of inlet zones opening into its own individual and separate mixing zone, and each mixing zone opening into its own individual and separate single spinning hole,
   (b) introducing a first polymer having fiber forming properties in a fluid state into a first inlet zone of each of said sets of inlet zones,
   (c) introducing a second polymer having fiber forming properties in a fluid state into a second inlet zone in each of said sets of inlet zones,
   (d) said first and second polymers having inherently poor interfacial adherent properties relative to each other,
   (e) causing *all* of said first and second polymers exciting from each set of first and second inlet zones to flow into an individual mixing zone that is not connected with any other set of inlet zones,
   (f) each said mixing zone being at least partially filled with a packing material having a diameter of about 0.2 mm. to 2.0 mm. and which forms a bed of at least 5 mm. thickness, and
   (g) causing the mixture of polymers flowing through each packed mixing zone to thereafter be extruded through a single spinning hole that is solely associated with said mixing zone,
   (h) the single composite fiber exciting from each of said single spinning holes having a jagged boundary interface for the component polymers, said jagged boundary interface being minutely and irregularly complicated when viewed from both the transverse and longitudinal axes of the filament.

(References on following page)

References Cited

UNITED STATES PATENTS

| | | | |
|---|---|---|---|
| 3,006,028 | 10/1961 | Calhoun | 18—8 SC |
| 3,038,240 | 6/1962 | Kovavik | 264—171 |
| 3,182,106 | 5/1965 | Fujita et al. | 264—171 |
| 3,344,472 | 10/1967 | Kitajima et al. | 264—171 |
| 3,447,308 | 6/1969 | Fontijin et al. | 57—140 |
| 3,469,279 | 9/1969 | Hudgel | 264—171 |
| 3,546,328 | 12/1970 | Lodge et. al. | 264—171 |
| 3,531,368 | 9/1970 | Okamoto et al. | 161—177 |

FOREIGN PATENTS

| | | | |
|---|---|---|---|
| 760,179 | 10/1956 | Great Britain | 264—171 |
| 524 | 1/1968 | Japan | 264—Dig. 26 |
| 19,604 | 8/1968 | Japan | 264—Dig. 26 |
| 9,047 | 5/1965 | Japan | 264—171 |
| 3,505 | 2/1969 | Japan | 264—171 |

JAY H. WOO, Primary Examiner

U.S. Cl. X.R.

264—168